United States Patent

[15] 3,641,763

Cole

[45] Feb. 15, 1972

| [54] | GAS TURBINE CATALYTIC EXHAUST SYSTEM | |
|---|---|---|
| [72] | Inventor: | Edward N. Cole, Bloomfield Hills, Mich. |
| [73] | Assignee: | General Motors Corporation, Detroit, Mich. |
| [22] | Filed: | Sept. 8, 1970 |
| [21] | Appl. No.: | 70,020 |

[52] U.S. Cl. ..............................60/39.51 H, 60/29, 165/10, 23/288 F
[51] Int. Cl. ......................................................F02c 7/10
[58] Field of Search .......................60/39.51 H, 39.82 C, 29; 165/10; 23/288 F

[56]  References Cited

UNITED STATES PATENTS

| 3,482,622 | 12/1969 | Bracken et al. | 165/10 |
| 3,116,605 | 7/1964 | Amann et al. | 60/39.51 H |
| 3,491,537 | 1/1970 | Stopa | 60/39.51 H |
| 3,177,928 | 4/1965 | Tumavicus et al. | 60/39.51 H |

FOREIGN PATENTS OR APPLICATIONS

| 1,037,485 | 12/1955 | Germany | 165/10 |
| 1,136,048 | 2/1961 | Germany | 165/10 |

*Primary Examiner*—Douglas Hart
*Assistant Examiner*—Warren Olsen
*Attorney*—Sidney Carter and Peter P. Kozak

[57]  ABSTRACT

A gas turbine engine including a rotary regenerator having an annular matrix with a catalytic material thereon exposed to exhaust gases passing through the matrix and effective to eliminate the noxious constituents thereof as part of the exhaust stream by catalytic reaction, the heats of such reaction being absorbed by the matrix, thereby providing increased sensible heat in the matrix effective to heat the incoming combustion air.

3 Claims, 3 Drawing Figures

INVENTOR.
Edward N. Cole
BY
Sidney Carter
ATTORNEY

GAS TURBINE CATALYTIC EXHAUST SYSTEM

This invention relates to gas turbine engines and, more particularly, to the catalytic treatment of exhaust gases from such engines to eliminate the noxious constituents thereof from the exhaust stream.

Currently, there is a family of gas turbine engines proposed for automotive and similar applications which use rotating disc-type regenerators to recover usable heat from the exhaust gas to preheat incoming combustion air thereby improving engine efficiency and reducing fuel consumption. In such regenerators, hot exhaust gas passes through a rotating porous matrix which absorbs heat from the exhaust stream and, subsequently, rejects the heat absorbed to the intake air from the compressor passing through the heated matrix.

Since the exhaust gas from gas turbine engines contains some amounts of such noxious constituents as carbon monoxide, unburned hydrocarbons and oxides of nitrogen, it is desirable to treat the gas turbine exhaust gases to eliminate these constituents as part of the exhaust stream. One of the more effective and reliable methods of treating exhaust gases is that of catalytic treatment wherein exhaust gases are passed into contact with a catalytic material which promotes the oxidation of carbon monoxide and unburned hydrocarbons to carbon dioxide and water and/or the reduction of oxides of nitrogen to $O_2$ and $N_2$. However, gas turbine engine operation is particularly sensitive to gas pressures and temperatures and exhaust back pressures and, as a result, such exhaust gas treatment apparatus as catalytic converters available to the internal combustion engine art which are positioned externally of the engine are not practical for use with gas turbine engines because of the excessive back pressures created thereby.

It is the principal object of this invention to provide for the catalytic treatment of gas turbine engine exhaust gases in combination with the regenerator portion of the gas turbine engine thereby providing a reliable and relatively low cost method of treating gas turbine engine exhaust gases without increasing the back pressure in the exhaust stream or otherwise adversely affecting engine operation.

It is further an object of this invention to provide for the treatment of exhaust gases from a gas turbine engine to promote reaction of the noxious constituents thereof to innocuous gases and, moreover, to incorporate the provision for treatment of gas turbine exhaust gases within an existing engine component thereby providing for the treatment of the exhaust gases while avoiding adversely affecting engine operation.

It is still further an object of this invention to combine the heat exchange function of the regenerator with the catalytic treatment of exhaust gases whereby the combination results not only in elimination of noxious constituents in the exhaust stream but also in increased efficiency of the gas turbine system.

These and other objects are accomplished by impregnating or coating the surface of the matrix portion of a gas turbine engine rotary regenerator which is exposed to both the exhaust gas stream and the incoming air with a catalytic material whereby the exhaust gases passing through the regenerator matrix are catalytically treated and the heats of reaction accompanying the oxidation and/or reduction of the undesirable constituents in the exhaust stream are absorbed by the matrix thereby simultaneously with the exhaust gas treatment providing increased heat available for preheating the incoming air. In the preferred embodiment of my invention, the matrix is formed of a thin walled ceramic honeycomb of bonded layers of alternate flat and corrugated ceramic sheet members which serve as a carrier for the catalytic material. The combination of catalytic material with a gas turbine engine regenerator results in both an effective and reliable means of treating the exhaust gases and increased efficiency of the engine as a result of the increased heat available for preheating of the incoming air.

Other objects and advantages of my invention will be apparent from the following detailed description reference being had to the accompanying drawings of which:

Figure 1:
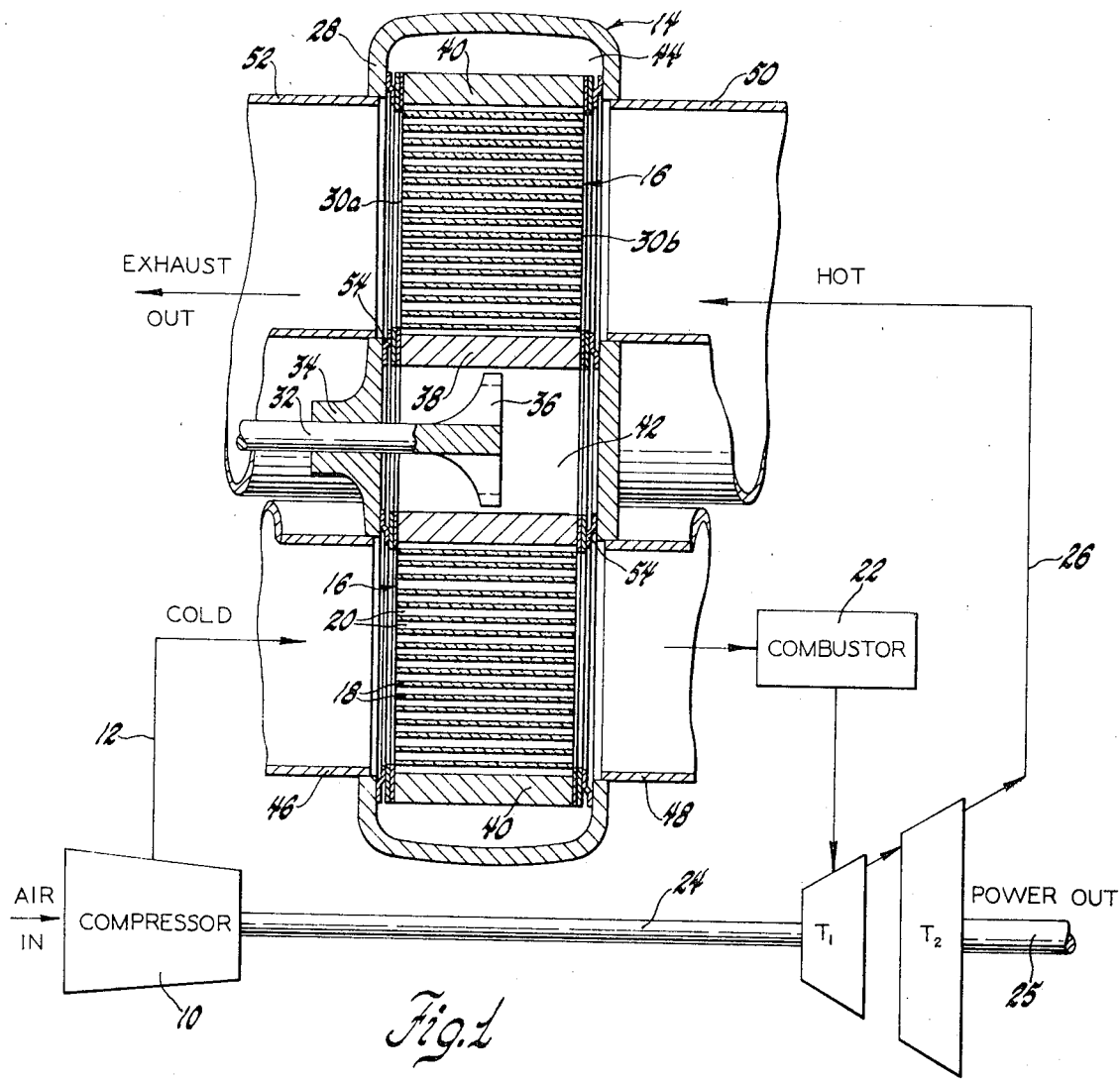
FIG. 1 is a schematic representation of a gas turbine engine including a fragmentary sectional view of the rotary regenerator portion taken in plane containing the axis of rotation thereof.

My invention will now be described in detail in relation to the operation of a gas turbine engine as illustrated by FIG. 1. Referring specifically to FIG. 1, cold fresh intake air enters a compressor 10 where power is employed to raise the pressure. The compressed intake air emerging from the compressor 10 passes through line 12 and into a regenerator 14 wherein it is heated to a high temperature. In the regenerator 14, as hereinafter more fully described, the compressed intake air passes through a matrix 16 having walls 18 defining unobstructed gas flow passages 20 and is heated by the heat stored in the matrix walls as it passes therethrough. The highly heated gas then passes to a combustor 22 where fuel is burned and its temperature is further raised thereby. The hot compressed gas then enters a turbine where it expands to a lower pressure and the energy released during expansion is converted to useful work. FIG. 1 illustrates two turbines, $T_1$ and $T_2$, in series through which the hot gas passes releasing a portion of its stored energy in each. In this arrangement work developed in turbine $T_1$ is used to drive the compressor 10 through a connecting shaft 24 and the work developed in turbine $T_2$ is supplied to the load through shaft 25. The exhaust gas emerging from the turbines passes through line 26 into the regenerator 14 where it gives up a substantial portion of its heat to the relatively cool matrix 16 as it passes therethrough. The gas now restored to its original condition is exhausted from the system.

Referring now in detail to FIG. 1, the regenerator 14 comprises a housing 28 which is generally drum-shaped and which encloses the annular matrix 16 which is of a structure having thin walls 18 defining very fine unobstructed gas flow passages 20 (greatly enlarged in FIGS. 1 and 3) extending between the opposed radial faces 30a and 30b of the matrix generally parallel to the axis of rotation defined by a driving shaft 32. Shaft 32 is mounted in suitable bearings in a boss 34 on the housing 28 and terminates in a spider 36 which is coupled by means (not shown) to the matrix 16 so that the matrix may be slowly rotated. The matrix 16 preferably includes a nonporous inner rim 38 and a nonporous outer rim 40. A generally cylindrical space 42 is defined within the interior of the matrix and a space 44 extends around the periphery of the matrix within the housing 28. An inlet 46 for the cold, high pressure air from the compressor 10 enters one face of the housing and opposite to it an outlet 48 is provided for the heated compressed air. The hot, low pressure exhaust gases enter through an inlet 50 and leave the regenerator through an outlet 52, the two fluid streams thus being in counterflow relation. A seal 54 conforming to the openings 46 and 48 for the compressed intake air and openings 50 and 52 for the low pressure exhaust gases is provided between each radial face of the matrix and housing in rubbing contact with the rotating matrix to confine the cold and hot gases to the desired flow paths through the matrix from inlet to outlet and thereby minimize leakage between the paths. During engine operation, the seal is held against the regenerator by the gas pressure differential between the high pressure incoming air and low pressure exhaust such that the seal is continuously in rubbing contact with the rotating matrix.

During engine operation, the matrix 16 rotates between the high pressure intake airflow path and the low pressure exhaust flow path such that after one portion of the matrix has been heated by the exhaust stream flowing therethrough the heated portion rotates into the intake airpath where the air flows through the matrix abstracting the heat stored in the matrix. It will be seen then, that the regenerator matrix is continually in a transient state of heat flow. Accordingly, it is necessary that the matrix material have such characteristics as a high operating temperature, low coefficient of thermal expansion, low thermal conductivity to prevent degradation by heat conduction parallel to the fluid flow and a suitable specific heat value or heat capacity in relation to the rotational speed of the matrix and engine operating conditions.

Figure 2:
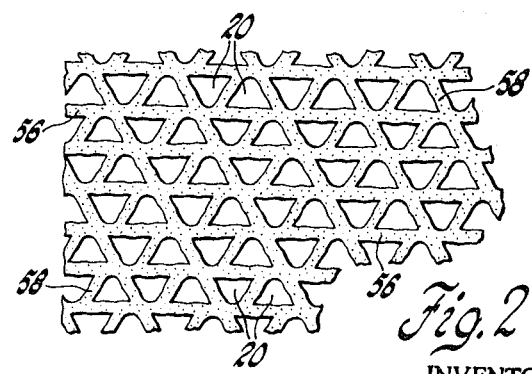
FIG. 2 is a greatly enlarged view of a portion of one face of a regenerator matrix illustrating the general nature of a porous ceramic matrix.

In the preferred embodiment of the invention, a ceramic matrix is used. A suitable ceramic matrix material is available from Corning Glass Works, Corning, N.Y., sold under the trade name "Cercor" which has the following thermal properties as listed by the manufacturer: maximum operating temperature 2,000° F., linear coefficient of thermal expansion (77° F–800° F)–$1 \times 10^{-7}$, thermal conductivity 5B.T.U./in./hr./ft²/°F and mean specific heat (77°F–800°F).24. This material is available in the form of a honeycomb structure having very thin walls in order that heat may be transferred very quickly to or from the given fluid. As illustrated by FIG. 2, the honeycomb is formed of alternate layers of flat ceramic sheets 56 and corrugated ceramic sheets 58 which are permanently ceramically bonded by firing at an elevated temperature and which define numerous very fine gas passages 20 (FIGS. 1, 2 and 3) extending parallel to the axis of the matrix. Typical honeycomb structures of the type described have an open frontal area greater than 70 percent, a wall thickness of about 0.005 inches, a surface area greater than 1,000 ft.²/ft.³ and can be formed with from about 350 to 1,000 cells/in.².

Figure 3:
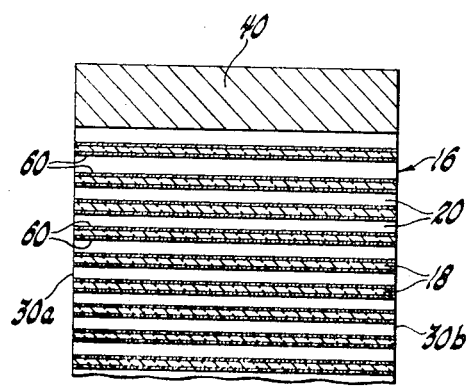
FIG. 3 is an enlarged fragmentary sectional view of the regenerator matrix portion of FIG. 1.

In accordance with the principal feature of my invention the matrix is provided with a catalytic material such that the exhaust gases passing through the gas passages of the matrix are contacted by the catalyst and are treated thereby. The presence of the catalytic material on the matrix may take several forms. For example, in ceramic regenerators matrices, the catalyst may be impregnated in the ceramic either during forming of the honeycomb or afterwards. Alternatively, the catalyst can appear as a surface coating on the matrix walls, as illustrated in FIG. 3, wherein a coextensive surface coating of catalytic material 60 is present on the matrix walls 18 defining the gas passages 20 whereby the catalytic material is exposed to the exhaust gas passing therethrough. In either case, however, it may be seen that the walls of the matrix act as a substrate or carrier for the catalyst in addition to their heat exchange function. When metallic regenerators are employed it is necessary to first provide a thin layer of such material as alumina on the metal surface with the catalyst being present as either an impregnation in the alumina or as a coating thereon such that the alumina acts as the carrier for the catalyst. My invention is not limited to the use of any particular catalyst but includes the use of any of the oxidation and/or reduction catalysts known to the art such as the noble metal catalysts, such as platinum and palladium, and the transition metal oxide catalysts, such as Cu, Ni, Co, Fe, Cr and Mn oxides and mixtures thereof, which are effective over extended periods of time at elevated temperatures typical of those found in gas turbine engines.

It is known that the oxidation of carbon monoxide and unburned hydrocarbons are highly exothermic reactions with the heats of such reactions being related to the temperature conditions and prevailing exhaust gas composition in accordance with the laws of chemical kinetics. Accordingly, when the exhaust gases contact the catalytic material in the regenerator and are reacted thereby, heat is released by the reactions and, as a result, an increased quantity of heat above the sensible heat of the gases exhausted from the turbine is present within the matrix. The matrix thus absorbs the heats of reaction released simultaneously with the catalytic treatment of the exhaust gases converting the reaction heat in addition to the heat of the exhaust gases to the form of sensible heat stored in the regenerator matrix. As a result, an increased amount of stored heat is available in the matrix for heating the incoming compressed air passing from the compressor to the combustor whereby the incoming air is heated to a higher temperature than normally attained. Accordingly, the fuel requirements needed for heating the compressed air in the combustor are reduced resulting in an overall increase in engine efficiency simultaneously with the treatment of the exhaust gases.

Although my invention has been described in terms of certain specific embodiments other forms may be adapted by those skilled in the art within the scope of the invention.

I claim:

1. A gas turbine engine comprising, in combination:
    a compressor for receiving intake air,
    a combustor operative to burn fuel and to heat the compressed intake air from said compressor,
    a turbine for receiving the heated compressed air wherein the heated compressed air expands to a lower pressure and power is developed therefrom, and
    a rotary regenerator comprising, in combination, a housing defining a first confined flow path for entry and exit of the compressed intake air passing from said compressor to said combustor and a second confined flow path for entry and exit of gases exhausted from said turbine and an annular matrix mounted across and rotatable between said flow paths and having a plurality of substantially parallel unobstructed gas passages extending therethrough through which the compressed intake air and the exhausted gases pass whereby heat from the exhausted gases is absorbed by said matrix in said second flow path and is transferred to the compressed intake air in said first flow path as said matrix rotates, said matrix including a catalytic material exposed to the exhausted gases effective to promote reaction of the noxious constituents thereof to innocuous gases and simultaneously to convert the heats of reaction thereof to increased sensible heat in said matrix effective to heat the compressed intake air in said first flow path.

2. Claim 1 wherein said matrix comprises a thin walled ceramic honey comb of ceramically bonded layers of alternate flat and corrugated ceramic sheet members which act as a carrier for said catalytic material.

3. Claim 1 wherein said matrix is of the axial-flow type including generally radial faces for entry and exit of the compressed intake air and the exhausted gases and wherein said gas passages extend between said faces generally parallel to the axis of rotation of said matrix.

* * * * *